March 9, 1965 L. J. HAAS 3,172,700
RETRACTABLE SEAT BELT
Filed Aug. 5, 1963

United States Patent Office 3,172,700
Patented Mar. 9, 1965

3,172,700
RETRACTABLE SEAT BELT
Lawrence J. Haas, 124 Oakwood Court, West Bend, Wis.
Filed Aug. 5, 1963, Ser. No. 299,713
3 Claims. (Cl. 297—388)

This invention relates to safety devices for use in vehicles such as automobiles or airplanes for preventing passengers from being thrown forward upon rapid deceleration of the vehicle. More particularly, this invention relates to retractable safety belts.

The injuries suffered by passengers in vehicle collisions are frequently due to the fact that the inertia of the passenger in the rapidly moving vehicle causes the passenger to be thrown forward suddenly when the vehicle is rapidly decelerated. Thus, in a collision, the driver, for example, of an automobile may be projected violently against the steering wheel and windshield of the car, and may be seriously or even fatally injured even though the car may in itself have more than sufficient structural strength to withstand the impact of the collision.

It has been proposed to prevent personal injury from this cause by providing safety belts or straps for the passengers, which are fastened to the frame of the vehicle and passed around the body of the passenger so as to restrain forward movement from the seat. Such devices have not met with favor because the loose ends of the belts are normally found disarranged on the seats or dangling toward the floor. The passengers sometimes sat down on the belts which then become entangled with their clothing. Further, it is somewhat of a struggle for most passengers to find the two halves of the buckles and engage them to fasten themselves in place.

In accordance with the invention claimed, a new and improved retractable safety device for a vehicle is provided comprising a drum. A belt is connected to the drum and is adapted to be wound thereon. Means are provided for normally yieldingly urging the drum in a rotating direction for winding the belt thereon. An electric wire is embedded within and extends longitudinally of the belt and is connected to a buckle or catch at the free end of the belt. A solenoid is arranged in the device and has its coil connected in series with the electrical wire and connected to one side of a source of electric power. The buckle or catch at the free end of the belt is connected when the belt is passed across the body of a passenger to the vehicle and to the other side of the source of electric power. The solenoid when energized causes its armature to engage the face of the belt to lock the belt in a given position.

It is, therefore, one object of this invention to provide a new and improved safety device for vehicles.

Another object of this invention is to provide a new and improved safety belt which retracts the belt or belts when not in use.

A further object of this invention is to provide a new and improved safety belt in which the belt when clamped around the body of a passenger is locked in place by a flow of current through at least a part of the belt structure.

A still further object of this invention is to provide a new and improved retractable safety structure in which the connection of the safety belt clamping means causes locking of the belt structure in a given position.

A still further object of this invention is to provide a new and improved dual purpose safety belt device which retracts the belts when the belt clamping means is detached and locks the belts in their extended positions when the belt ends are engaged and clamped together.

Objects and advantages other then those set forth will be apparent from the following description when read in connection with the accompanying drawing, in which.

Figure 1:
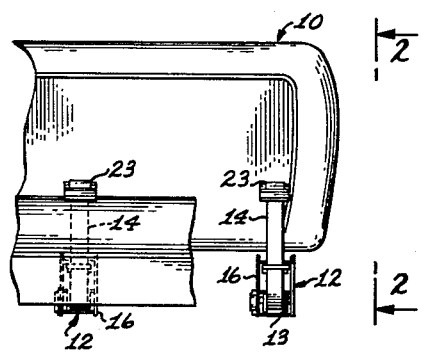
FIG. 1 is a partial top view of a vehicle seat embodying the invention and illustrating the safety belts in their retracted position.
Figure 2:
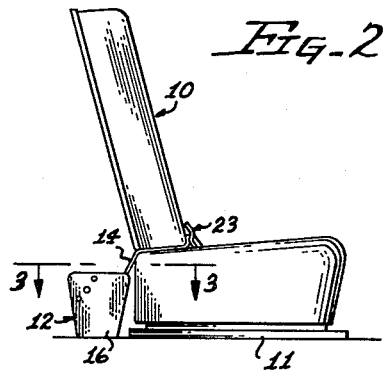
FIG. 2 is a side elevational view of the vehicle seat shown in FIG. 1.

Referring more particularly to the drawing by characters of reference, FIGS. 1 and 2 illustrate a vehicle seat 10 mounted on a vehicle base or supporting member 11. The vehicle is provided at the two sides of each passenger reclining area with retractable safety belt mechanisms 12 shown in FIGS. 3, 4 and 5 which are each attached to a suitable place on the vehicle, preferably on the floor behind the seat. The safety belt mechanisms 12 each comprise a yieldable take up reel or drum 13 for the strap or belts 14 which are mounted on a stationary axle 15 fixed to a sturdy frame work 16. Each drum is formed with a hub portion about which the associated strap or belt is wound. For yieldingly holding the drum in normally wound up position an annular recess 18 is formed in flange 19 at one end of the drum to house a coil spring 20. One end of the spring may be attached to the outer hub portion 21 of the drum while the other end of the spring extends through and is attached to an aperture 22 in flange 19.

In FIGS. 1 and 2 the safety belts 14 are shown in their normally retracted position within housing or frame work 16. As shown in FIG. 2 when so retracted the buckles or clamping means 23 on the ends of the belts remain projected from frame work 16 so as to be visible and accessible. A metallic or plastic guide (not shown) may be arranged through or between the back rest and the seat of the vehicle to the passenger reclining area for guiding the movement of the belt in its extending or retracting movement.

When the safety belts 14 are extended and clamped around the body of a passenger, the action of the reels or drums 13 would normally maintain a tension on belts 14. This tension though gentle might become uncomfortable to the passenger. To obviate any such discomfort and particularly to lock the safety belts 14 in given extended positions an interlocking means 25 is provided. This interlocking means comprises a solenoid having a core (not shown), coil 26 and armature 27 mounted in a housing 28. Housing 28 is mounted within framework 16 of the safety mechanism. The solenoid is so arranged that its armature is spring biased into its retracted position when coil 26 is deenergized. Upon the energization of coil 26 armature 27 is actuated outwardly to engage the surface of belt 14.

A pair of crank arms 29 are pivotally mounted one on each of the sidewalls of framework 16 and have attached therebetween at their free end a cylinder 30. Cylinder 30 is attached to armature 27. When armature 27 is actuated outwardly, cylinder 30 is forced into contact with the face of belt 14.

Figure 4:
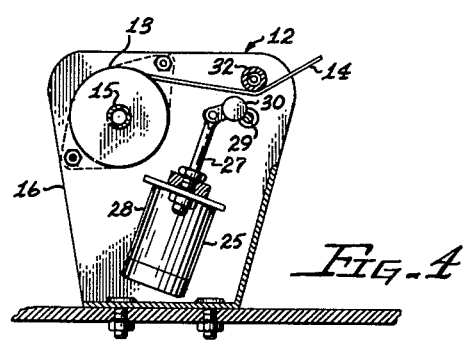
FIG. 4 is a cross sectional view of the interlocking means shown in FIG. 3 taken along the line 4—4.
Figure 3:
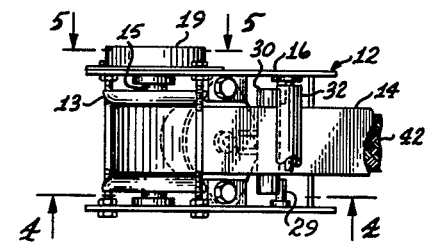
FIG. 3 is a view of the interlocking means illustrated in FIG. 2 taken along the lines 3—3.
Figure 5:
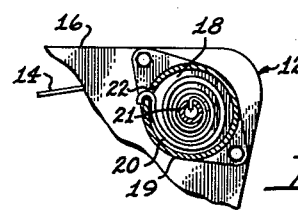
FIG. 5 is a cross sectional view of the interlocking means shown in FIG. 3 taken along the line 5—5 and showing the belt retracting means.

As shown in FIGS. 3 and 4 belt 14 is fed from drum 13 over a roller 32, which is rotatably mounted between the sidewalls of framework 16, to the passenger area of the seat of the vehicle. Cylinder 30 which is attached to armature 27 engages the surface of belt 14 on the opposite side of the belt from roller 32 but adjacent to the spot where roller 32 engages the belt. In this manner the cylinder attached to armature 27 engages the belt at a point where it is taut and has support on the opposite side thereof.

Figure 6:
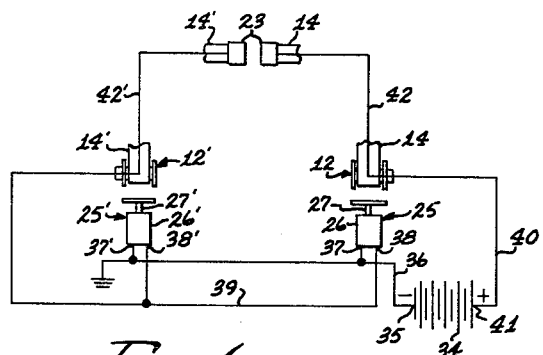
FIG. 6 is a wiring diagram of the structure shown in FIGS. 1–5.

In order to energize coil 26 to hold the belt in a given position when the belt is clamped around the body of a passenger a source of electric power must be provided. FIG. 6 is a schematic illustration of a wiring diagram of one example of a pair of safety belt mechanisms 12 connected together to form a unit for securing a passenger in his seat. In accordance with the invention claimed a suitable source of electric power is provided such as, for example, a 6 or 12 volt battery 34. One terminal of battery 34 such as its negative terminal 35 is connected through a conductor 36 to terminals 37 and 37' of coil 26, 26' of the solenoids shown. Terminals 38, 38' of coils 26, 26' are connected through a conductor 39 to the belt 14' of the belt mechanism 12'. A conductor 40 connects the positive terminal 41 of battery 34 to belt 14 of the belt mechanism 12. Belt mechanisms 12 and 12' are identical. Each of the belts shown are arranged to be interconnected by clamping means 23 so as to firmly hold the passenger in his seat.

In order to complete the electric circuit across the source of electric power 34, a pair of electric wires 42, 42' are embedded within or attached to belts 14, 14' to extend along all or at least a part of their length. These wires are electrically connected to the parts of the clamping means 23 so that when the parts of the clamping means are connected together an electric circuit comprising the series connection of the solenoid coils 26, 26' and wires 42, 42' are connected across battery 34, as shown in FIG. 6.

The solenoid coils 26, 26' when energized cause these armatures and associated mechanisms to move into contact with the surfaces of belts 14, 14' to lock the belts and their associated drums in given belt extended positions. The belts are held locked in these positions until the current flow is interrupted through the solenoid coils which occurs upon separation of the parts of the buckle or clamping means 23.

Since the current flow necessary to actuate the armatures of the solenoids into belt engaging position is small the operation of the safety belt mechanism and particularly the clamping means 23 would not involve any harmful risk. It is suggested that the outer surface of the clamping means be insulated and that the electrical contact necessary for completion of an electric circuit through the solenoids occur inside of the clamping means. Any arcing of the parts which might occur upon separation of the clamping parts should occur in the insulating housing of the clamping structure.

Although FIG. 6 shows the positive potential of the battery connected to wires 42 and 42' in belts 14, 14' it is noted that the battery terminals may be reversed and the negative terminal of the battery or ground directly connected to conductors 42, 42' in belts 14, 14'. This connection would eliminate insulating the buckles 23 and avoid arcing upon their separation. The grounded buckle connection would then necessitate insulating coils 26, 26' from the ground of the automobile.

It is intended to be within the scope of this invention to utilize only one safety belt mechanism 12 per installation wherein a single belt 14 and clamping means 23 may be utilized by clamping directly to a cooperating catch part on the frame of the vehicle. In this manner one safety belt mechanism may be used per passenger.

Thus, the above disclosed invention features a retractable safety belt for either cars, airplanes or the like wherein the belt travels through metallic or plastic guides between the seat back and the base of the seat to a spring biased drum. This drum takes up the belt or adjusts its length as needed. When the safety belts are not in use, the belts are rolled up beneath the seat and out sight.

The locking device on the mechanism is automatically effective when the buckle or clamping means on the belts are connected together. If the belts are locked around the passenger of the vehicle the passenger is restrained from the inertia effects of quick stopping or accidental collisions and the resulting bodily damage occurring therewith. The belts remain out of sight when not in use.

While the foregoing description describes certain specified forms of the invention by way of example, it will be understood that they are merely for purposes of illustration to make clear the principle of the invention, which is not limited to the particular form shown but is acceptable to various modifications and adaptations in different installations as will be apparent to those skilled in the art without departing from the scope of the invention as stated in the following claims.

What is claimed is:

1. A safety belt mechanism for vehicles comprising a drum, a belt connected to said drum and adapted to be wound thereon, means for normally yieldingly urging said drum in a rotating direction for winding said belt on said drum, an electric wire embedded within said belt, a solenoid comprising a coil and armature, means for connecting said coil in series with said wire to one side of a source of electric power, and catch means arranged at the free end of said belt in electrical contact with said wire for connecting said belt when passed across the body of a passenger to the vehicle and to the other side of the source of electric power, said solenoid when energized causing said armature to engage said belt to lock said belt in a given position.

2. A safety belt mechanism for vehicles comprising a drum, a belt connected to said drum and adapted to be wound thereon, means for normally yieldingly urging said drum in a rotating direction for winding said belt on said drum, an electric wire connected to said belt, a solenoid comprising a coil and armature, means for connecting said coil in series with said wire to one side of a source of electric power, and catch means arranged at the free end of said belt and in electrical contact with said wire for connecting said belt when passed across the body of a passenger to the vehicle and to the other side of the source of electric power, said solenoid when energized causing said armature to engage the face of said belt to lock said belt in a given position.

3. A safety belt mechanism comprising a pair of spaced drums, a pair of belts one being connected to each of said drums and adapted to be wound thereon, means for normally yieldingly urging each of said drums in a rotating direction for winding said belts on each of said drums, a pair of electric wires one arranged to pass along at least a part of the length of each of said belts, a solenoid comprising a coil and armature, means for connecting said coil in series with one of said wires to a terminal of a source of electric power, and catch means comprising a pair of interconnecting parts, one of said parts being arranged at the free end of each of said belts and in electrical contact with one of said wires for connecting said belts together when passed across the body of a passenger, said catch means completing an electric circuit through said wires and said coil across the source of electric power, said solenoid when energized causing said armature to engage the face of one of said belts to lock said belts in their given positions.

References Cited by the Examiner

UNITED STATES PATENTS

| 2,510,115 | 6/50 | Jakosky | 297—385 |
| 2,705,529 | 4/55 | Bull | 297—386 |
| 2,868,309 | 1/59 | Burgess | 297—385 |
| 2,880,789 | 4/59 | Leibinger | 297—385 |

FRANK B. SHERRY, *Primary Examiner.*